(12) United States Patent
Seok et al.

(10) Patent No.: US 9,332,493 B2
(45) Date of Patent: May 3, 2016

(54) COMMUNICATION METHOD AND COMMUNICATION APPARATUS BY STATION THAT OPERATES IN POWER SAFE MODE IN WIRELESS LAN SYSTEM

(71) Applicant: LG ELectronics Inc., Seoul (KR)

(72) Inventors: Yong Ho Seok, Anyang-si (KR); Hyang Sun You, Anyang-si (KR); Ji Hyun Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 100 days.

(21) Appl. No.: 14/342,866

(22) PCT Filed: Nov. 2, 2012

(86) PCT No.: PCT/KR2012/009163
§ 371 (c)(1),
(2) Date: Mar. 5, 2014

(87) PCT Pub. No.: WO2013/066097
PCT Pub. Date: May 10, 2013

(65) Prior Publication Data
US 2014/0211680 A1    Jul. 31, 2014

Related U.S. Application Data

(60) Provisional application No. 61/555,485, filed on Nov. 4, 2011.

(51) Int. Cl.
*G08C 17/00* (2006.01)
*H04W 52/02* (2009.01)

(52) U.S. Cl.
CPC ...... *H04W 52/0206* (2013.01); *H04W 52/0216* (2013.01); *Y02B 60/50* (2013.01)

(58) Field of Classification Search
None
See application file for complete search history.

(56) References Cited

U.S. PATENT DOCUMENTS

| 2006/0217147 | A1 | 9/2006 | Olvera-Hernandez et al. | |
| 2009/0323608 | A1* | 12/2009 | Adachi et al. | 370/329 |
| 2013/0142124 | A1* | 6/2013 | Abraham et al. | 370/328 |

FOREIGN PATENT DOCUMENTS

| JP | 2011-211612 A | 10/2011 |
| KR | 10-2006-0070570 A | 6/2006 |
| KR | 1020080092445 A | 10/2008 |
| KR | 1020100046341 A | 5/2010 |

* cited by examiner

*Primary Examiner* — Minh-Trang Nguyen
(74) *Attorney, Agent, or Firm* — Dentons US LLP (57) ABSTRACT

A method for communication performed by a station in a wireless local area network system is provided. The method includes receiving a first change sequence from an access point, transmitting a probe request frame to an access point in order to request updated system information, the probe request frame including the first change sequence, and receiving a probe response frame from the access point in response to the probe request frame. The probe response frame includes a second change sequence. The first change sequence and the second change sequence indicate a change of system information within a basic service set (BSS).

11 Claims, 8 Drawing Sheets

COMMUNICATION METHOD AND COMMUNICATION APPARATUS BY STATION THAT OPERATES IN POWER SAFE MODE IN WIRELESS LAN SYSTEM

This application is a 35 USC §371 National Stage entry of International Application No. PCT/KR2012/009163, filed on Nov. 2, 2012, which claims priority of U.S. Provisional Application No. 61/555,485, filed on Nov. 4, 2011, all of which are hereby incorporated by reference in their entirety.

BACKGROUND OF THE INVENTION

The present invention relates to a wireless communication, and more particularly, to a communication method performed by a station (STA) that operates in a power save mode in a Wireless Local Area Network (WLAN) system and to the apparatus for supporting the method.

RELATED ART

With the growth of information communication technology, various wireless communication technologies have been recently developed. Among others, Wireless Local Area Network (WLAN) is a technology that allows for wireless access to the Internet at home or business or in a specific service area using a handheld terminal such as a personal digital assistant (PDA), a laptop computer, a portable multimedia player (PMP), etc.

IEEE 802.11n is a technology standard that has been recently established in order to overcome the limit to communication speed that has been recognized as a weakness of WLAN. IEEE 802.11n aims to increase network speed and reliability and expand coverage of a wireless network. More specifically, the IEEE 802.11n system adopts MIMO (Multiple Inputs and Multiple Outputs) technology that uses multiple antennas at both a transmission unit and a reception unit thereof so as to optimize data speed and to minimize transmission errors while supporting a high throughput (HT) of data processing speed up to 540 Mbps.

In the WLAN system, a station (STA) supports a power save mode. The STA is capable to prevent the unnecessary power consumption by entering and operating in a doze state. The STA operating in the power save mode is capable of operating in switching between an awake state and the doze state. The STA operating in the doze state periodically may enter in the awake state at every specified time or specified interval, and may identify whether there is any frame to transmit and/or receive by itself or not. In addition, the STA may enter in the awake state from the doze state, and receive information in relation to the system from an access point (AP), thereby maintain the timing synchronization with the AP.

For the STA that operates in the power save mode, the time duration operating in the doze state may get longer than the previous. The longer the STA operates in the doze state, the higher possibility of deviation occurs on the synchronization of the timing and the system information between the STA and the AP. If the time synchronization of the STA is deviated from the AP, the time maintaining in the awake state may be extended to receive the information relevant to the system from the AP, which may result in the unnecessary power consumption of the STA. In addition, if the STA fails to maintain the synchronization of the system information with the AP, it results in the problem that normal WLAN services may not be provided. Therefore, the communication method is required in order to maintain the synchronization of the timing and the system information between the STA and the AP.

SUMMARY OF THE INVENTION

An object of the present invention is to provide a communication method performed by a station (STA) that operates in a power save mode in a Wireless Local Area Network (WLAN) system and the apparatus for supporting the method.

In an aspect, a communication method performed by a station (STA) that operates in a power save mode in a wireless LAN system is provided. The method includes transmitting a probe request frame to an access point (AP), the probe request frame including a system information identification information to identify system information acquired by the STA, and receiving a probe response frame from the AP in response to the probe request frame. The probe response frame includes a time stamp value relevant to a time when the probe response frame being transmitted. When it is determined that an updated information is existed, which is not included in the acquired system information based on the system information identification information, the probe response frame further includes the updated information.

The system information identification information may indicate the time stamp value which is in relation to the time when the system information acquired already is to be received.

It may be determined that the updated information which is not included in the acquired system information exists, if the time stamp value indicated by the system information identification information is smaller than the time stamp value at the time when the system information is recently updated by the AP.

The system information identification information may indicate a change sequence that indicates an update version of the acquired system information.

It may be determined that the updated information which is not included in the acquired system information exists, if the change sequence value indicated by the system information identification information is smaller than the change sequence value that indicates the update version of the system information that is managed by the AP.

The probe response frame may further include the change sequence that indicates an update version of the system information that is managed by the AP, if the updated information which is not included in the acquired system information is determined to be existed.

In another aspect, a wireless apparatus operable in a wireless LAN system is provided. The wireless apparatus includes a transceiver transmitting and receiving a radio signal, and a processor functionally connected to the transceiver. The processor is configured to transmits a probe request frame to an access point (AP), wherein the probe request frame includes a system information identification information that identifies system information already acquired by the wireless apparatus, and receive a probe response frame in response to the probe request frame. The probe response frame includes a time stamp value relevant to a time when the probe response frame is transmitted. The probe response frame further includes the updated information, if the updated information which is not included in the acquired system information is determined to be existed.

In still another aspect, a communication method performed by an access point (AP) in a wireless LAN system is provided. The method includes receiving a probe request frame from a station (STA), the probe request frame including information relevant to a wake-up duration time when the STA operates in an awake state, and transmitting a probe response frame to the STA in response to the probe request frame. The probe response frame is transmitted within the wake-up duration time.

The probe request frame may include a sleep wait field that indicates a time which the wake-up duration time is started from.

The probe request frame may further include a wake-up duration time field that indicates the wake-up duration time.

The STA may enter in a doze state at the time of being indicated by the sleep wait field, if the STA receives the probe response frame before the duration time of maintaining in the awake state is over, which is indicated by the wake-up duration time field, it enters in the awake state.

The STA may enter in the doze state when the duration time maintaining in the awake state is over, if the STA fails to receive the probe response frame until the duration time maintaining in the awake state is over.

According to the communication method as an exemplary embodiment of the present invention, the STA that operates in the power save mode may actively synchronize the timing by transmitting the probe request frame to the AP. In the environment in which the timing error may be increased between the local clock of the STA and the global clock of the BSS, which caused by elongated time interval operating in the doze state by the STA, the timing may be synchronized by the request of the STA. Accordingly, the power consumption may be prevented, which may be occurred when the STA enters in the awake state at the wake-up interval according to the local clock and waits for receiving the beacon frame, and the STA may acquire the system information more quickly because the waiting time decreases.

According to the communication method as an exemplary embodiment of the present invention, the STA that operates in the power save mode transmits the information of identifying the system information to the AP, which is the basis for the system management by itself. The AP may identify the presence of the updated information that is not acquired by the STA among the system information which is the basis of the BSS management at present based on the corresponding system information identification information. Consequently, the AP may selectively provide the updated information to the STA, and the STA may acquire the system information more quickly through it, and may carry out the operation in order to be provided of normal WLAN service.

According to the communication method as an exemplary embodiment of the present invention, the STA may be signaling the specific time when the response of the AP is given at the request of the timing synchronization and/or the updated system information. The unnecessary power consumption of the STA may be prevented, which occurs by maintaining in the awake state unnecessarily during the delay time due to the preparation of the frame by the AP after entering in the awake state at the wake-up interval.

DESCRIPTION OF EXEMPLARY EMBODIMENTS

Figure 1:
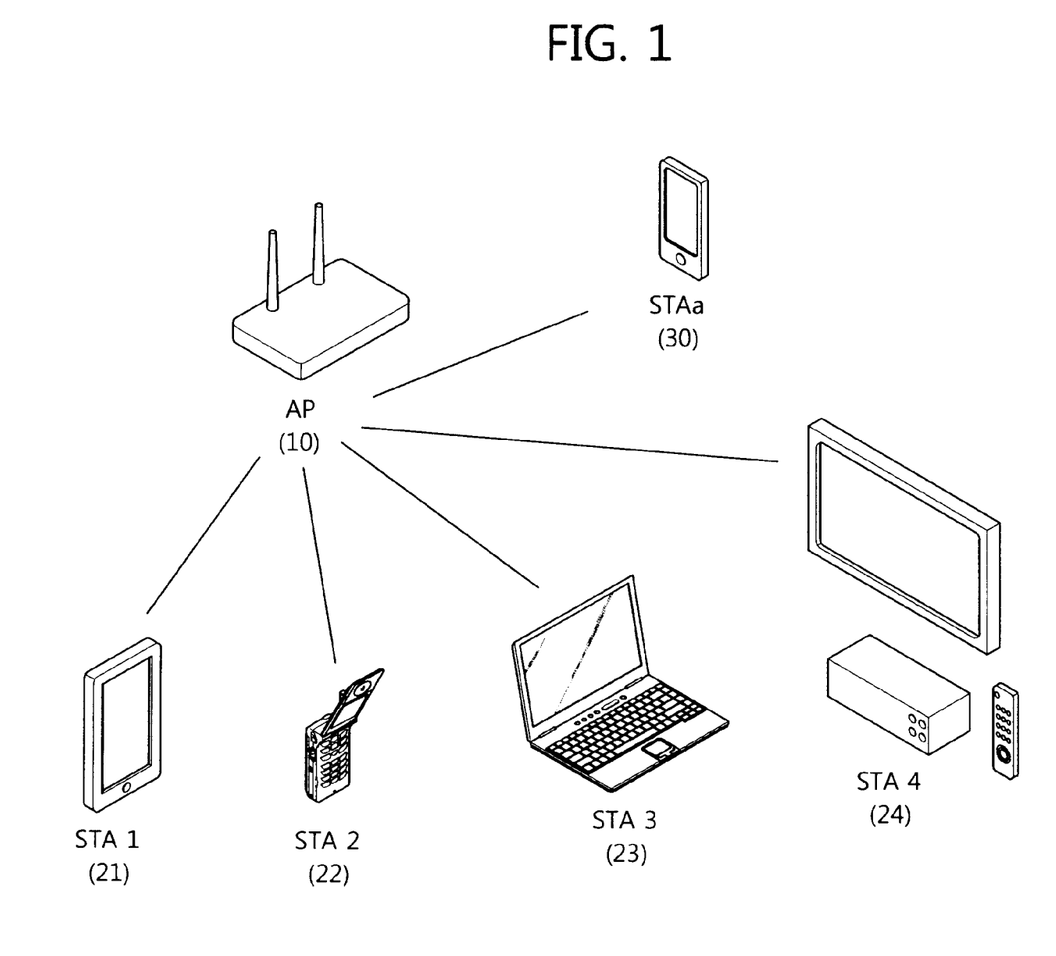
FIG. 1 is a view illustrating the configuration of a general Wireless Local Area Network (WLAN) system to which an embodiment of the present invention may apply.

FIG. 1 is a view illustrating the configuration of a general Wireless Local Area Network (WLAN) system to which an embodiment of the present invention may apply.

Referring to FIG. 1, the WLAN system includes one or more basic service sets (BSSs). A BSS is a set of stations (STAs) that may be successfully synchronized with each other and may communicate with each other, and is not a concept indicating a specific area.

An infrastructure BSS includes one or more non-Access Point (AP) stations (non-AP STA1(21), non-AP STA2(22), non-AP STA3(23), non-AP STA4(24), and non-AP STAa (30)), an AP 10 providing a distribution service, and a distribution system (DS) linking multiple APs. In the infrastructure BSS, the AP manages the non-AP STAs of the BSS.

In contrast, an independent BSS (IBSS) is a BSS operating in an ad-hoc mode. The IBSS does not include an AP and thus lacks a centralized management entity. That is, in the IBSS, non-AP STAs are managed in a distributed manner. In the IBSS, all the STAs may be mobile STAs, and due to no permission to access the DS, constitute a self-contained network.

The STA is any functional entity that includes a medium access control (MAC) and a physical layer interface for a radio medium that follow the Institute of Electrical and Electronics Engineers (IEEE) 802.11 standards and in broader concept includes an AP and a non-AP station.

A non-AP STA is a STA that is not an AP, and may also be referred to as a mobile terminal, wireless device, wireless transmit/receive unit (WTRU), user equipment (UE), mobile station (MS), mobile subscriber unit or simply user. Hereinafter, for ease of description, the non-AP STA is denoted STA.

The AP is a functional entity that provides access to a DS via a radio medium for a STA associated with an AP. In an infrastructure BSS including an AP, communication between STAs is in principle achieved via an AP, but in case a direct link is set up, the STAs may perform direct communication between each other. The AP may also be referred to as a central controller, base station (BS), node-B, BTS (Base Transceiver System), site controller, or managing STA.

A plurality of BSSs including the BSS shown in FIG. 1 may be connected to each other via a distribution system (DS). The plurality of BSSs linked with each other through a DS is referred to as an extended service set (ESS). The APs and/or STAs included in the ESS may communicate with each other, and in the same ESS, STAs may travel from one BSS to another BSS while maintaining seamless communication.

In the WLAN system according to IEEE 802.11, the basic access mechanism of Medium Access Control (MAC) is a Carrier Sense Multiple Access with Collision Avoidance (CSMA/CS) mechanism. The CSMA/CS mechanism is also referred to as Distributed Coordination Function (DCF) of IEEE 802.11 MAC, and basically, it adopts a "listen before talk" access mechanism. Following such type of access mechanism, an AP and/or STA senses a radio channel or medium prior to transmission. If as a result of the sensing, the medium is determined to be in idle state, frame transmission is initiated through the medium. On the contrary, if the medium is sensed to be in occupied state, the AP and/or STA sets a deferred time for medium access and waits without starting its own transmission.

The CSMA/CS mechanism includes virtual carrier sensing in addition to physical carrier sensing in which an AP and/or STA directly senses a medium. The virtual carrier sensing is to make up for a problem that may occur in connection with medium access, such as hidden node problem. In order for virtual carrier sensing, the MAC of the WLAN system makes use of a network allocation vector (NAV). The NAV is a value by which an AP and/or STA currently using a medium or having authority to use the medium informs other AP and/or STA of a time remaining until the medium turns available. Accordingly, the value set by the NAV corresponds to a period during which the use of the medium is scheduled by the AP and/or STA transmitting a frame.

The IEEE 802.11 MAC protocol, together with a DCF, offers a Hybrid Coordination Function (HCF) that is based on a Point Coordination Function (PCF) that periodically performs polling so that all receiving APs and/or STAs may receive data packets in polling-based synchronized access scheme with the DCF. The HCF has an Enhanced Distributed Channel Access (EDCA) that has a contention-based access scheme for providing data packets to multiple users and HCCA (HCF Controlled Channel Access) that uses contention free-based channel access scheme using a polling mechanism. The HCF includes a medium access mechanism for enhancing Quality of Service (QoS) of WLAN and may transmit QoS data in both a contention period (CP) and contention free period (CFP).

In the WLAN system, the network discovery process is implemented as a scanning procedure. The scanning procedure is separated into passive scanning and active scanning. The passive scanning is achieved based on a beacon frame that is periodically broadcast by an AP. In general, an AP in the WLAN system broadcasts a beacon frame at a specific interval (for example, 100 msec). The beacon frame includes information on a BSS managed by it. The STA passively awaits reception of the beacon frame at a specific channel. When obtaining the information on the network by receiving the beacon frame, the STA terminates the scanning procedure at the specific channel. The STA need not transmit a separate frame in achieving passive scanning, and the passive scanning is rather done once the beacon frame is received. Accordingly, the passive scanning may reduce the overall overhead. However, it suffers from a scanning time that is increased in proportion to the transmission period of the beacon frame.

The active scanning is that the STA actively broadcasts a probe request frame at a specific channel to request that all the APs to receive the probe request frame send network information to the STA. The Table 1 below represents information elements which may be included in the probe request frame.

TABLE 1

| Order | Information Element |
|---|---|
| 1 | SSID (Service Set ID) |
| 2 | Supported Rates |
| 3 | Request Information |
| 4 | Extended Supported Rates |
| 5 | DSSS (Direct Sequence Spread Spectrum) Parameter Set |
| 6 | Supported Operation Classes |
| 7 | HT (High Throughput) Capabilities |
| 8 | 20/40 BSS (Basic Service Set) Coexistence |
| 9 | Extended Capability |
| Last | Vender Specific |

When receiving the probe request frame, an AP waits for a random time so as to prevent frame collision, and then includes network information in a probe response frame, then transmits the probe response frame to the STA. The Table 2 below represents information elements which may be included in the probe response frame.

TABLE 2

| Order | Information Element |
|---|---|
| 1 | Timestamp |
| 2 | Beacon Interval |
| 3 | Capability |
| 4 | SSID (Service Set ID) |
| 5 | Supported Rates |
| 6 | FH (Frequency Hopping) Parameter Set |
| 7 | DSSS Parameter Set |
| 8 | CF (Contention Free) Parameter Set |
| 9 | IBSS (Independent BSS) Parameter Set |
| 10 | Country |
| 11 | FH Parameters |
| 12 | FH pattern Table |
| 13 | Power Constraint |
| 14 | Channel Switch Announcement |
| 15 | Quiet |
| 16 | IBSS DFS (Direct Frequency Selection) |
| 17 | TPC (Transmit Power Control) Report |
| 18 | ERP (Extended Rate PHY) |
| 19 | Extended Supported Rates |
| 20 | RSN (Robust Security Network |
| 21 | BSS Load |
| 22 | EDCA (Enhanced Distributed Channel Access) Parameter Set |
| 23 | Measurement Pilot Transmission |
| 24 | Multiple BSSID |
| 25 | RM (Radio Measurement) Enabled Capabilities |
| 26 | AP Channel Report |
| 27 | BSS Average Access Delay |
| 28 | Antenna |
| 29 | BSS Available Admission Capacity |
| 30 | BSS AC (Access Category) Access Delay |
| 31 | Mobility Domain |
| 32 | DSE (Dynamic STA Enablement) Registered Location |
| 33 | Extended Channel Switch Announcement |
| 34 | Supported Operation Classes |
| 35 | HT (High Throughput) Capabilities |
| 36 | HT Operation |
| 37 | 20/40 BSS Coexistence |
| 38 | Overlapping BSS Scan Parameters |
| 39 | Extended Capability |
| Last-1 | Vender Specific |
| Last-2 | Requested Elements |

The STA receives the probe response frame to thereby obtain the network information, and the scanning procedure is then ended. The active scanning may get scanning done relatively quickly, but may increase the overall network overhead due to the need of a frame sequence that comes from request-response.

When finishing the scanning procedure, the STA selects a network per a specific standard on itself and then performs an authentication procedure alongside the AP. The authentication procedure is achieved in 2-way handshake. When completing the authentication procedure, the STA proceeds with an association procedure together with the AP.

The association procedure is performed in two-way handshake. First, the STA sends an association request frame to the AP. The association request frame includes information on the STA's capabilities. Based on the information, the AP determines whether to allow association with the STA. When determining whether to allow association, the AP transmits an association response frame to the STA. The association response frame includes information indicating whether to allow association and information indicating the reason for association being allowed or failing. The association response frame further includes information on capabilities supportable by the AP. In case association is successfully done, normal frame exchange is done between the AP and STA. In case association fails, the association procedure is retried based on the information on the reason for the failure included in the association response frame or the STA may send a request for association to other AP.

In order to overcome limit to speed that is considered to be a weakness in WLAN, IEEE 802.11n has been established relatively in recent years. IEEE 802.11n aims to increase network speed and reliability while expanding wireless network coverage. More specifically, IEEE 802.11n supports high throughput (HT) that reaches data processing speed up to 540 Mbps and is based on MIMO (Multiple Inputs and Multiple Outputs) technology that adopts multiple antennas at both transmission end and reception end in order to optimize data speed and minimize transmission errors.

As WLAN spreads and more diversified applications using WLAN show up, a need for a new WLAN system arises for supporting a higher throughput than the data processing speed supported by IEEE 802.11n. The WLAN system supporting very high throughput (VHT) is a subsequent version of the IEEE 802.11n WLAN system, which is a new one recently suggested to support a throughput more than 500 Mbps for a single user and data processing speed more than 1 Gpbs for multiple users in an MAC service access point (SAP).

Advancing further than the existing WLAN system supporting 20 MHz or 40 MHz, the VHT WLAN system intends to support 80 MHz, contiguous 160 MHz, non-contiguous 160 MHz band transmission and/or more bandwidth transmission. Further, the VHT WLAN system supports 250 Quadrature Amplitude Modulation (QAM) that is more than a maximum of 64QAM of the existing WLAN system.

Since the VHT WLAN system supports a Multi User-Multiple Input Multiple Output (MU-MIMO) transmission method for higher throughput, the AP may transmit a data frame simultaneously to at least one or more MIMO-paired STAs. The number of paired STAs may be maximally 4, and when the maximum number of spatial streams is eight, each STA may be assigned up to four spatial streams.

Referring back to FIG. 1, in the WLAN system shown in the figure, the AP 10 may simultaneously transmit data to a STA group including at least one or more STAs among a plurality of STAs 21, 22, 23, 24, and 30 associated with the AP 10. In FIG. 1, by way of example, the AP conducts MU-MIMO transmission to the STAs. However, in a WLAN system supporting Tunneled Direct Link Setup (TDLS) or Direct Link Setup (DLS) or mesh network, a STA to transmit data may send a Physical Layer Convergence Procedure (PLCP) Protocol Data Unit (PPDU) to a plurality of STAs using an MU-MIMO transmission scheme. Hereinafter, an example where an AP transmits a PPDU to a plurality of STAs according to an MU-MIMO transmission scheme is described.

Data may be transmitted through different spatial streams to each STA. The data packet transmitted by the AP 10 may be referred to as a PPDU, which is generated at the physical layer of the WLAN system and transmitted, or a frame as a data field included in the PPDU. That is, the PPDU for Single User-Multiple Input Multiple Output (SU-MIMO) and/or MU-MIMO or data field included in the PPDU may be called a MIMO packet. Among them, the PPDU for MUs may be called an MU packet. In the example of the present invention, assume that a transmission target STA group MU-MIMO-paired with the AP 10 includes STA1 21, STA2 22, STA3 23, and STA4 24. At this time, no spatial stream is assigned to a specific STA in the transmission target STA group, so that no data may be transmitted to the specific STA. Meanwhile, assume that STAa 30 is associated with the AP but is not included in the transmission target STA group.

In the WLAN system, an identifier may be assigned to the transmission target STA group in order to support MU-MIMO transmission, and this identifier is denoted group ID. The AP sends a group ID management frame including group definition information for allocating group IDs to the STAs supporting MU-MIMO transmission and accordingly the group IDs are assigned to the STAs before PPDU transmission. One STA may be assigned a plurality of group IDs.

Table 3 below represents information elements included in the group ID management frame.

TABLE 1

| Order | Information |
|---|---|
| 1 | Category |
| 2 | VHT action |
| 3 | Membership status |
| 4 | Spatial stream position |

The category field and VHT action field are configured so that the frame corresponds to a management frame and to be able to identify being a group ID management frame used in a next-generation WLAN system supporting MU-MIMO.

As in Table 3, the group definition information includes membership status information indicating whether to belong to a specific group ID, and in case of belonging to the group ID, information indicating the number of position to which the spatial stream set of the STA corresponds in all the spatial streams according to MU-MIMO transmission.

Since one AP manages a plurality of group IDs, the membership status information provided to one STA needs to indicate whether the STA belongs to each of the group IDs managed by the AP. Accordingly, the membership status information may be provided in the form of an array of subfields indicating whether it belongs to each group ID. The spatial stream position information indicates the position of each group ID, and thus, may be provided in the form of an array of subfields indicating the position of a spatial stream set occupied by the STA with respect to each group ID. Further, the membership status information and spatial stream position information for one group ID may be implemented in one subfield.

The AP, in case of sending a PPDU to a plurality of STAs through an MU-MIMO transmission scheme, transmits the PPDU, with information indicating a group identifier (group ID) in the PPDU as control information. When receiving the PPDU, a STA verifies whether it is a member STA of the transmission target STA group by checking the group ID field. If the STA is a member of the transmission target STA group, the STA may identify what number of position where the spatial stream set transmitted to the STA is located in the entire spatial stream. The PPDU includes information on the number of spatial streams allocated to the receiving STA, and thus, the STA may receive data by discovering the spatial streams assigned thereto.

Figure 2:
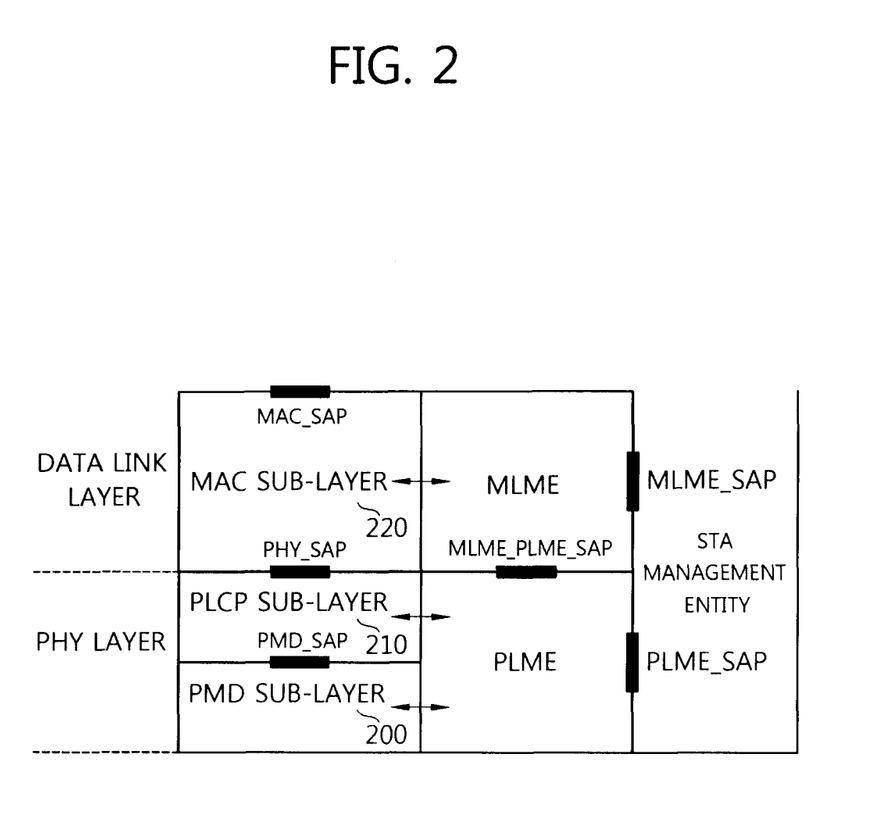
FIG. 2 is a view illustrating a physical layer architecture of a WLAN system supported by IEEE 802.11.

FIG. 2 is a view illustrating a physical layer architecture of a WLAN system supported by IEEE 802.11.

The IEEE 802.11 physical (PHY) architecture includes a PHY Layer Management Entity (PLME), a Physical Layer Convergence Procedure (PLCP) sublayer 210, and a Physical Medium Dependent (PMD) sublayer 200. The PLME provides a function of managing the physical layer in cooperation with the MAC Layer Management Entity (MLME). The PLCP sublayer 210 delivers an MAC Protocol Data Unit (MPDU) received from the MAC sublayer 220 to the PMD sublayer in response to an instruction of the MAC layer between the MAC sublayer 220 and the PMD sublayer 200 or delivers a frame coming from the PMD sublayer 200 to the MAC sublayer 220. The PMD sublayer 200 is a PLCP lower layer and enables transmission and reception of a physical layer entity between two stations through a radio medium. The MPDU delivered by the MAC sublayer 220 is denoted a Physical Service Data Unit (PSDU) in the PLCP sublayer 210. The MPDU is similar to the PSDU, but in case an aggregated MPDU (A-MPDU) obtained by aggregating a plurality of MPDUs is delivered, each MPDU may be different from each PSDU.

The PLCP sublayer 210 adds an additional field including information needed by a physical layer transceiver while delivering a PSDU from the MAC sublayer 220 to the PMD sublayer 200. At the time, the added field may include a PLCP preamble to the PSDU, a PLCP header, or tail bits necessary for turning a convolution encoder back into the zero state. The PLCP sublayer 210 receives from the MAC sublayer a TXVECTOR parameter including control information necessary to generate and transmit a PPDU and control information necessary for the STA to receive and analyze a PPDU. The PLCP sublayer 210 uses information included in the TXVECTOR parameter in generating a PPDU including the PSDU.

The PLCP preamble plays a role to let the receiver prepare for a synchronization function and antenna diversity before the PSDU is transmitted. The data field may include a coded sequence where the PSDU, padding bits attached to the PSDU, a service field including a bit sequence for initializing a scrambler, and the tail bits are encoded. At the time, as an encoding scheme, depending on the encoding scheme supported by the STA receiving the PPDU, Binary Convolution Coding (BCC) encoding or Low Density Parity Check (LDPC) encoding may be selected. The PLCP header includes a field including information on the PPDU to be transmitted.

The PLCP sublayer 210 adds the above-described fields to the PSDU to thereby generate a PPDU and transmits the PPDU to a receiving station via the PMD sublayer, and the receiving STA receives the PPDU and obtains the information necessary for restoring data from the PLCP preamble and PLCP header and restores data. The PLCP sublayer of the receiving station delivers to the MAC sublayer the RXVECTOR parameter including the control information contained in the PLCP header and the PLCP preamble and may analyze the PPDU and obtain data in the receiving state Always sensing a channel for frame transmission and reception causes the STA to continue to consume power. The power consumption in the reception state makes little difference as compared with the power consumption in the transmission state, so that keeping the reception state causes the STA battery powered to consume relatively more power. Accordingly, when in the WLAN system a STA conducts channel sensing while continuously maintaining the reception waiting state, inefficient power consumption may arise without particularly increasing WLAN throughput, and thus, it is inappropriate in view of power management.

To compensate for such problems, the WLAN system supports a power management (PM) mode for a STA. The STA power management mode is separated into an active mode and a power save (PS) mode. The STA operates basically in the active mode. The STA operating in the active mode maintains an awake state. That is, the STA remains at a state of being able to perform normal operation such as frame transmission and reception or channel sensing.

When in normal operation, the STA shifts between the doze state and awake state. In the doze state, the STA operating with the minimum power and does not receive radio signals including data frames from the AP. Further, in the doze state, the STA does not conduct channel sensing.

As the STA operates as long as possible, power consumption decreases, so that the operation period of the STA is increased. However, since frame transmission and reception is impossible in the doze state, it cannot be left at the operation state unconditionally. In case there is a frame to be transmitted from the STA operating in the doze to the AP, the STA shifts to the awake state, thereby able to receive frames. However, in case the AP has a frame to be transmitted to the STA operating in the doze state, the STA cannot receive the frame nor is the STA able to be aware of the existence of the STA. Accordingly, the STA may require the operations of being aware of whether there is a frame to be sent to the STA, and if any, shifting to the awake state at a specific period so as to receive the frame. This is described below in connection with FIG. 3.

Figure 3:
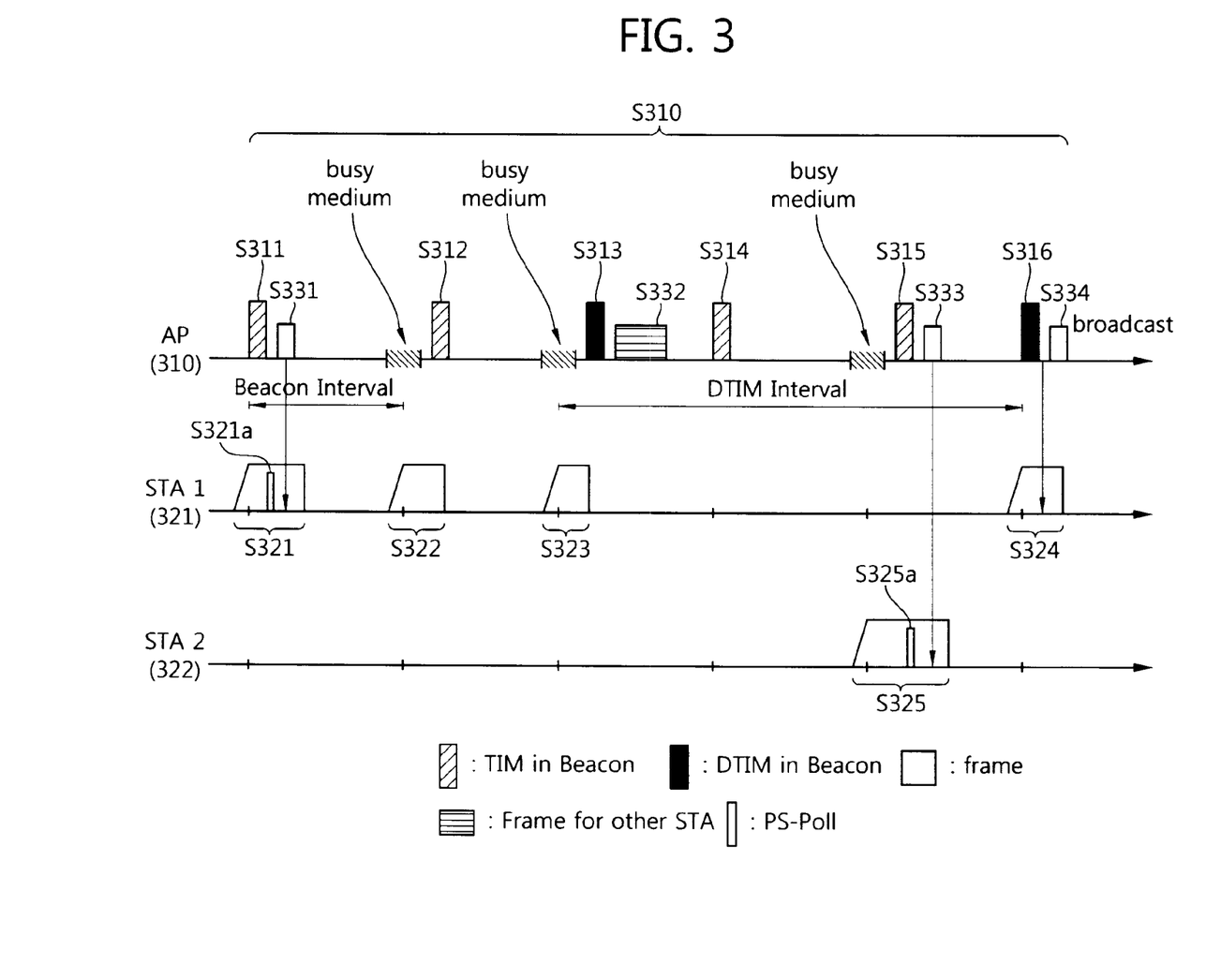
FIG. 3 is a view illustrating an example of power management operation.

FIG. 3 is a view illustrating an example of power management operation.

Referring to FIG. 3, the AP 310 sends a beacon frame to STAs in a BSS at a constant period (S310). The beacon frame includes a Traffic Indication Map (TIM) information element. The TIM element includes information indicating that the AP 310 buffers a bufferable frame (or bufferable unit; BU) for the STAs associated with the AP 310 and that the frame is to be sent. The TIM element includes a TIM used to indicate a unicast frame and a Delivery Traffic Indication Map (DTIM) used to indicate a multicast or broadcast frame.

The AP 310 transmits a DTIM once every three beacon frames of transmission.

STA1 321 and STA2 322 are STAs operating in PS mode. STA1 321 and STA2 322 shift from the doze state to the awake state at every wakeup interval of a specific period so that the STAs may receive the TIM element transmitted from the AP 310.

A specific wakeup interval may be configured so that STA1 321 may shift to the awake state at every beacon interval to thus receive a TIM element. Accordingly, when the AP 310 first sends out a beacon frame (S311), STA1 321 switches to the awake state (S321). STA1 321 receives the beacon frame and obtains the TIM element. In case the obtained TIM element indicates that a bufferable frame to be sent to STA1 321 is being buffered, STA1 321 transmits a PS-poll frame to the AP 310 to request that the AP 310 send a frame (S321a). In response to the PS-poll frame, the AP 310 sends a frame to STA1 321 (S331). When completely receiving the frame, STA1 321 turns back to the doze state.

When the AP 310 sends out a second beacon frame, since the medium is occupied, for example, as if another device gains access to the medium, the AP 310 fails to send a beacon frame at exact beacon interval and may deferred transmission of the beacon frame (S312). In such case, STA1 321 turns its operation mode to the awake state according to the beacon interval, but cannot receive the deferred beacon frame, so that STA1 321 switches back to the doze state (S322).

When the AP 310 sends out a third beacon frame, the beacon frame may include a TIM element that is set as DTIM. However, since the medium is occupied, the AP 310's transmission of the beacon frame is deferred (S313). STA1 321 switches to the awake state in accordance with the beacon interval and may obtain the DTIM through the beacon frame transmitted by the AP 310. The DTIM obtained by STA1 321 indicates that there is no frame to be transmitted to STA1 321 and that there is a frame for other STA. Accordingly, STA1 321 shifts back to the doze state. The AP 310, after transmission of the beacon frame, sends a frame to the STA (S332).

The AP 310 sends a fourth beacon frame (S314). However, STA1 321 could not obtain the information indicating that a bufferable frame for itself remains buffered through the previous twice reception of the TIM element, and thus, STA1 321 may adjust the wakeup interval for reception of a TIM element. Or, in case the beacon frame transmitted by the AP 310 includes signaling information for adjusting the wakeup interval value of STA1 321, the wakeup interval value of STA1 321 may be adjusted. In this example, STA1 321 may change its configuration so that shift of the operation state for receiving a TIM element is performed at every three beacon intervals rather than at every beacon interval. Accordingly, STA1 321 stays at the doze state after the AP 310 sends a fourth beacon frame (S314) and when the AP 310 transmits a fifth beacon frame (S315), and thus, it cannot obtain the TIM element.

When the AP 310 sends out a sixth beacon frame (S316), STA1 321 switches to the awake state and obtains the TIM element included in the beacon frame (S324). The TIM element is a DTIM indicating that there is a broadcast frame, so that STA1 321 does not transmit a PS-poll frame to the AP 310 and receives a broadcast frame transmitted by the AP 310 (S334).

Meanwhile, the wakeup interval configured in STA2 322 may have a longer period than that of STA1 321. Accordingly, when the AP 310 sends a fifth beacon frame (S315), STA2 322 may switch to the awake state to receive a TIM element (S325). STA2 322 is aware that there is a frame to be sent thereto through the TIM element, and in order to request transmission, sends a PS-poll frame to the AP 310 (S325*a*). The AP 310 sends a frame to STA2 322 in response to the PS-poll frame (S333).

In order to operate the power save mode as shown in FIG. 3, the TIM element includes a TIM indicating whether there is a frame to be sent to the STA or a DTIM indicating whether there is a broadcast/multicast frame. The DTIM may be embodied by configuring a field of the TIM element.

In the WLAN system that is operating based on the above power management method, the STA may synchronize the timing based on the beacon frame transmitted from the AP and/or the time stamp information included in the probe response frame. That is, the STA may synchronize the local clock in relation to the management of the STA with the time in relation to the management of the AP, thus all elements within the BSS that is managed by the AP may operate based on the synchronized global clock or BSS clock.

The STA that operates in the power save mode may enter in the doze state by turning off the power of the transceiver in case the power save mode is unnecessary. The STA may wake up at the time when the beacon frame is transmitted based on the local clock, and may identify whether there is any frame which is going to be forwarded or forward.

The STA may enter in the awake state and receive the beacon frame. The STA may prevent the timing error that may occur during the time when the STA operates in the doze state, and synchronize the local clock with the global clock by receiving the beacon frame. In addition, the STA may identify whether the system information is updated or not during the time when the STA operates in the doze state, and may acquire the updated system information through the beacon frame in case of being updated. What the STA acquires the updated system information by receiving the beacon frame is the mechanism which is necessary to operate using the configuration parameters which are commonly configured between the STA and the AP.

Meanwhile, as various communication services such as smart grid and e-Health, or ubiquitous services appear, the Machine to Machine (M2M) to support such services draws attention. A sensor for sensing temperature or moisture, a camera, a home appliance such as a TV, or a bulky machine including a factory processing machine or a vehicle may be one element of an M2M system. Elements constituting an M2M system may transmit and receive data based on WLAN communication. In case devices of an M2M system supports WLAN and configure a network, the system is hereinafter referred to as an M2M WLAN system.

The M2M-supportive WLAN system has the following features.

1) Large number of stations: Unlike an existing network, M2M is on the basis of an assumption that a large number of STAs exist within a BSS. This is because, sensors, or the like, installed in houses, companies, and the like, are all considered. Thus, a considerably large number of STAs may be connected to a single AP.

2) Low traffic load per STA: Since an STA has a traffic pattern of collecting and reporting surrounding information, information is not required to be frequently sent and an amount of information is small.

3) Uplink-centered communication: M2M has a structure in which a command is mainly received by downlink, an action is taken, and result data is reported to uplink. Primary data is generally transmitted in uplink, so in a system supporting M2M, uplink is the core.

4) Power management of STA: An M2M terminal largely operates with a battery, so it is difficult for a user to frequently charge it in many cases. Thus, a power management method for minimizing battery consumption is required.

5) Automatic recovery function: it is difficult for a user to directly manipulate a device constituting an M2M system in a particular situation, so the device is required to have a self-recovery function.

Hereinafter, the WLAN system that supports the M2M having such characteristics will be described as an example in order to describe an embodiment of the present invention. However, the scope of the present invention is not limited to the WLAN system that supports the M2M, but rather may be applied throughout the wireless communication systems including general WLAN system.

In accordance with a server/client structure in a general WLAN system, a client such as STA sends a request for information to a server, and the server sends information to the STA in response to the request. At the time, the server that has provided information may be considered a machine that mechanically collects and offers information, and an entity that has received the information may be a user using the client. Due to such structural nature, downlink-oriented communication technology has been mainly developed in the existing WLAN systems.

On the contrary, in the M2M-supportive WLAN system, an opposite of the above structure applies. In other words, the client, a machine, gathers and provides information, and the user managing the server may request information. That is, in the M2M-supportive WLAN system, the M2M server issues a command related to ambient environment measurement to M2M STAs and the M2M STAs conduct operation per the command and report the collected information to the server, in general communication flow. Unlike the previous, the user happens to access the network in the side of the server, and the communication flow goes in the opposite direction. These are structural features of the M2M-supportive WLAN system.

The frequency of the operation actively carried out by the STA that operates based on the control of the network relatively decreases in comparison with the operation of the normal condition. When the operation of the STA is controlled by the network, the STA operates only by the response to the control. Otherwise, the STA may be configured to save the power unnecessarily consumed by entering in the doze state.

According to the characteristics as such, for the STA that operates in the power save mode, the time duration operating in the doze state may get longer than the time duration operating in the previous state. As the time gets longer in which the STA operates in the doze state, the timing error may get increased between the local clock and the global clock of the STA. In this case, the time difference becomes greater between the estimated time of the STA for the beacon frame to be forwarded based on the local clock and the time for the beacon frame actually being transmitted by the AP. The STA may keep in the awake state for a long time to receive the beacon frame as much as the time difference becomes greater, which results in the problem that the unnecessary power consumption may be increased by the STA. Accordingly, a communication method is required in order to decrease the unnecessary power consumption which is cause by the STA that operates in the power save mode and to maintain the synchronization of the timing and the system information between the STA and the AP.

In order to solve the problem above, the present invention suggests the method of transmitting the probe request frame to the AP instead of the STA entering in the awake state and waiting to receive the beacon frame.

Figure 4:
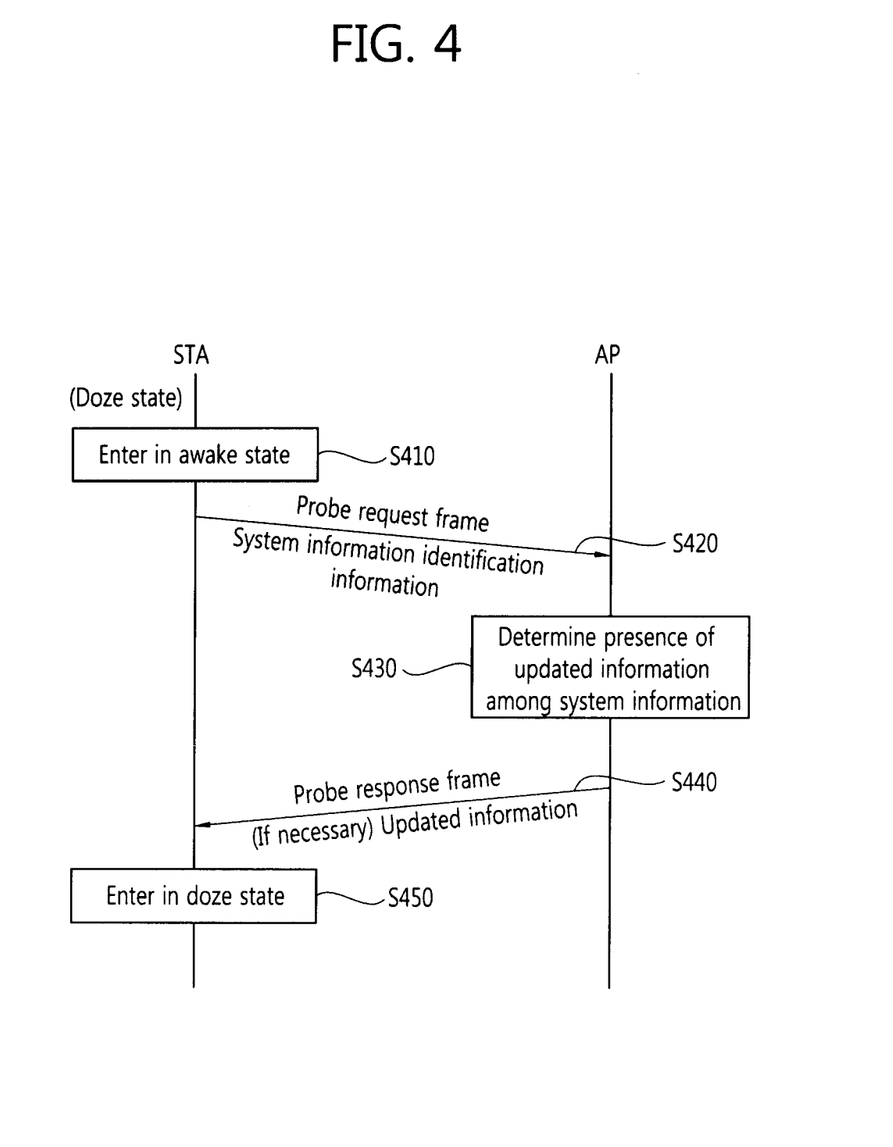
FIG. 4 is a flow chart illustrating an example of the communication method performed by the STA that operates in the power save mode according to an embodiment of the present invention.

FIG. 4 is a flow chart illustrating an example of the communication method performed by the STA that operates in the power save mode according to an embodiment of the present invention.

Referring to FIG. 4, the STA that is operating in the doze state enters in the awake state at the specific time by the wake up interval (S410).

The STA that enters in the awake state transmits the probe request frame to the AP after acquiring the channel access authority based on the channel access mechanism such as the DCF in order to access the channel (S420). The STA may request the updated system information and the information relevant to the global clock while operating in the doze state, by transmitting the probe request frame to the AP.

While the STA broadcasts the probe request frame during the active scanning process, the probe request frame that calls for the updated system information and/or the information relevant to the global clock may be transmitted to the AP by the unicast method.

The probe request frame may have the format by the above represented table 1, may further include the system information identification information. The system information identification information is the information which is able to identify the system information that the STA has recently received by the AP. The system information identification information may be included in the probe request frame as a format of an element of the system information identification information.

The AP receives the probe request frame that is transmitted from the STA, and determines whether there exists any information updated which does not belong to the STA among the present system information based on the system information identification information (S430). The information updated, for example, means an alteration or a re-configuration of an information element consisting of the system information like the AP re-configures the values of the EDCA parameter set.

The AP transmits the probe response frame to the STA in response to the probe request frame (S440). The format of the probe response frame transmitted by the AP may have the format as represented by the table 2. However, if the AP determines that there is any information updated, the AP may transmit the corresponding information updated to the STA with the information being included in the probe response frame.

The STA receives the probe response frame from the AP, and enters in the doze state (S450). The STA may update its system information based on the updated information acquired. In addition, the STA may synchronize the local clock with the global clock based on the value of a timing synchronization function (TSF) of the time stamp field included in the probe response frame.

The process of determining the presence of the updated information that is not included in the STA among the present system information is implemented differently according to the way of the specific embodiment of the system information identification information. Hereinafter, an embodiment of the present invention will be described in more detail according to an implementation of the system information identification information that may be included in the probe request frame.

1. The Case of Implementation of the Time Stamp by Using the System Information Identification Information The time stamp may be implemented by using the system information identification information, which is a basis of the AP to identify whether there is any information updated or not. When updating a part or the whole of the system information, the AP may save the TSF at the corresponding time. The value of the TSF will be denoted by Tu below.

If the STA may acquire the system information through receiving the beacon frame and/or the probe response frame from the AP, the STA may save the information which is relevant to the beacon frame and/or the probe response frame, which are/is the most recently received. The beacon frame and the probe response frame may include the time stamp field which is containing the information relevant to the time of the corresponding frame to be transmitted. Accordingly, the terminal may save the TSF value of the time stamp field which is included in the beacon frame and/or the probe response frame which has/have been received in the most recently.

When the STA transmits the probe request frame to the AP, the STA may set up the TSF value as the system information identification information. In this case, the system information identification information may have the format as illustrated by FIG. 5 below.

Figure 5:
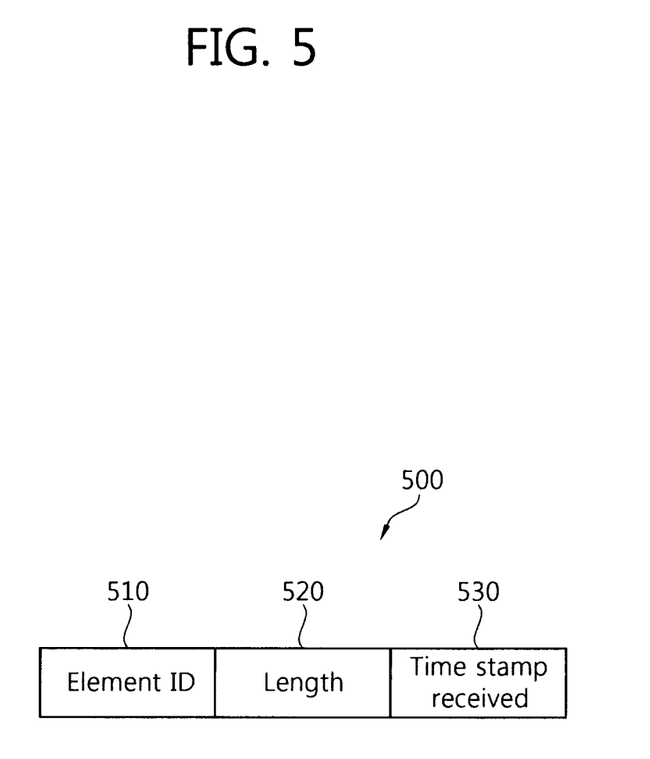
FIG. 5 is a block diagram illustrating an example of the format of the system information identification information according to an embodiment of the present invention.

FIG. 5 is a block diagram illustrating an example of the format of the system information identification information according to an embodiment of the present invention.

Referring to FIG. 5, the system information identification information element 500 may include an element ID field 510, a length field 520 and a time stamp field 530 that is received.

The element ID field 510 may indicate that the corresponding information element is system information identification information.

The time stamp field 530 may be set up as TSF value which is indicated by the time stamp field including the beacon frame or the probe response frame which is received in the most recently.

In step, S430, the AP may receive the probe request frame, and may determine the presence of the updated information by comparing the Tu value and the value of the time stamp field received that is included in the system information identification information element. The method for determination will be described below.

1) In Case that the Value Indicated by the Time Stamp Field Received is Greater than or Equals to the Tu Value The AP may determine that any updated information is not existed. Accordingly, the AP may transmit the probe response frame in which the time stamp frame may be included, but the information relevant to the system information may not be included.

2) In Case that the Value Indicated by the Time Stamp Field Received is Smaller than the Tu Value The AP may determine that the updated information is existed. Accordingly, the AP may transmit the prove response frame in which the time stamp filed and the updated information may be included.

Meanwhile, when more than one information element among the system information is updated, it may be implemented to save and manage each of Ti as a TSF value that is relevant to the updated information, and IEi as the updated information corresponding to the TSF value. The updated information may be saved as vector form of [Ti, IEi] by the maximum number N or during the maximum time interval of DMax (where, N is an integer of 1 or greater, DMax is a time interval longer than the doze time, i is an integer that is greater than or equals to 1 and smaller than or equals to N, and i increase by 1 as the update timing is delayed.).

In step, S430, the AP may receive the probe request frame, and may compare the value indicated by the time stamp field which is included in the probe request frame received with each of the Ti values. By the comparison, the updated information may be determined as follows.

1) When the value indicated by the time stamp field received is smaller than a specific Tn, the probe response frame may include the updated information IEi that corresponds to the Ti that is greater than Tn.

2) When the value indicated by the time stamp field received is greater than or equals to a specific Tn, the probe response frame may include the time stamp field, but may not include the updated frame.

2. The Case of Implementation of a Change Sequence by Using the System Information Identifying Information As the system information identification information on which is a basis of the AP identifying the presence of the updated information, a change sequence that indicates the version of the system information may be used. When the AP updates a part or the whole of the system information, the AP may update the change sequence, for example, may increase the change sequence of the specific value. The specific value of the change sequence may be implemented by an integer, and the increment is implemented by '1'. That is, the change sequence may identify the system information of a specific time, and the order of the system information that differs each other may be determined by comparing the change sequences.

When the AP transmits the beacon frame and/or the probe response frame, it may transmit including the change sequence that corresponds to the system information included. When the STA acquires the system information through receiving the beacon frame and/or the probe response frame from the AP in the previous time, the STA may save the change sequence which is in the most recently received.

When the STA transmits the probe request frame to the AP, the STA may set up the change sequence value as the system information identification information. In this case, the system information identification information may have the format illustrated in FIG. 6 below.

Figure 6:
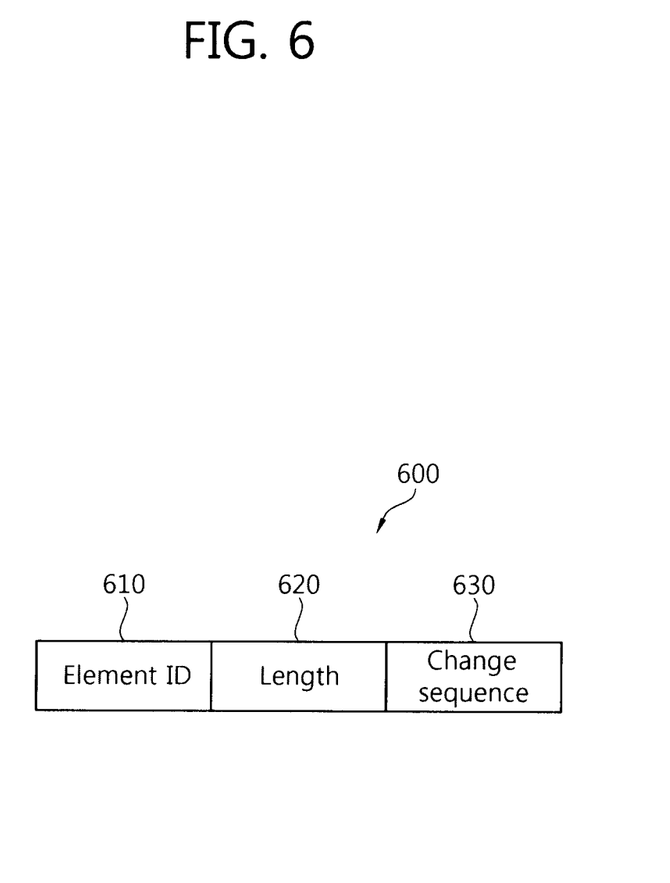
FIG. 6 is a block diagram illustrating another example of the format of system information identification information element according to an embodiment of the present invention.

FIG. 6 is a block diagram illustrating another example of the format of system information identification information element according to an embodiment of the present invention.

Referring to FIG. 6, the system information identification information element 600 may include an element ID field 610, a length field 620 and a change sequence field 630.

The element ID field 610 may indicate that the corresponding information element is the system information identification information. The length field 620 may indicate the length of the change sequence field 630.

The change sequence field 630 may set up as the change sequence value that is included in the most recent beacon frame or the probe response frame received by the STA.

In step, S430, the AP may determine the presence of the updated information by comparing the change sequence value indicated by the change sequence field of the probe request frame with the change sequence value presently set up by the AP. The detailed method for determination is described as follows.

1) When the Value Indicated by the Change Sequence Field is Greater than or Equals to the Change Sequence Value that is Set Up by the AP The AP may determine that the updated information is not existed. Accordingly, the AP may transmit the probe response frame in which the time stamp field may be included, but the information relevant to the system information may not be included.

2) When the Value Indicated by the Change Sequence Field is Smaller than the Change Sequence Value that is Set Up by the AP The AP may determine that the updated information is existed. Accordingly, the AP may transmit the probe response frame in which the time stamp field, the updated information and the change sequence signaling field that indicates the change sequence that is set up by the AP may be included.

In the embodiment described by FIG. 4, the AP transmits the prove response frame right upon receiving the probe request frame from the STA. However, there may be a case that the AP is unable to response with the probe response frame without delay when the AP receives the probe request frame. This is because the time to patch the frame is required to transmit the probe response frame after the AP receives the probe request frame. In addition, since the probe response frame is transmitted by a contention based on the channel access mechanism such as the DCF, the time of maintaining in the awake state may be elongated in order for the STA to receive the probe response frame. That may result in the problem that the STA consumes the power unnecessarily. Accordingly, when the STA transmits the probe request frame and requests the information relevant to the system information of the AP and the global clock, the STA may transmit the probe request frame which includes the information relevant to the timing when you want to receive the answer in response to the request.

Figure 7:
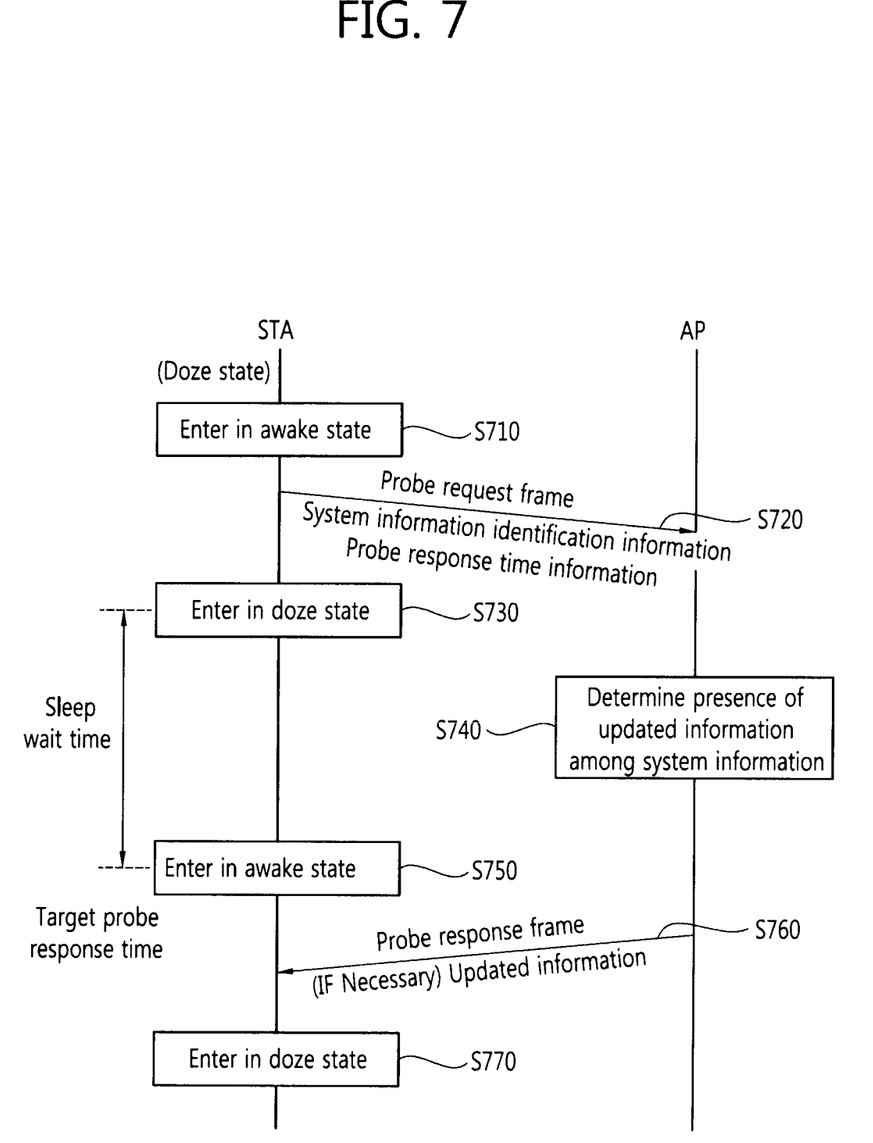
FIG. 7 is a flow chart illustrating an example of the communication method performed by the STA that operates in a power save mode according to another embodiment of the present invention.

FIG. 7 is a flow chart illustrating an example of the communication method performed by the STA that operates in a power save mode according to another embodiment of the present invention.

Referring to FIG. 7, the STA that operates in the doze state enters in the awake state at a specific timing by the wake up interval (S710).

The STA that enters in the awake state transmits the probe request frame to the AP after acquiring the channel access authority based on the channel access mechanism such as the DCF in order to access the channel (S720). The STA may request the changed system information of the AP and the information relevant to the global clock while the STA operates in the doze state, by transmitting the probe request frame to the AP.

Meanwhile the STA broadcasts the probe request frame during the active scanning process, the probe request frame that request the updated system information and/or the information relevant to the global clock may be transmitted to the AP by the unicast method.

The probe request frame may have the format by the above represented table 1, may further include the system information identification information element including the format and the information that is described above by referring FIGS. 4 to 6.

Meanwhile, the probe request frame may further include the probe response time information element. The probe response time information element is to indicate the target probe response time, which is the time when the AP requests to transmit the probe response frame. Indicating the target probe response time may be implemented by indicating the sleep waiting time which is maintaining the sleep mode from the time when the probe request frame is transmitted. In this case, the probe response time information element may include the sleep waiting field, which may indicate the sleep waiting time.

The STA may enter in the doze state after transmitting the probe request frame (S730).

The AP receives the probe request frame transmitted from the STA, and determines whether there is any updated information which does not belong to the STA among the present system information, based on the system information identification information (S740). What the AP determines whether any updated information is existed or not is described with reference to FIGS. 4 to 6.

The STA transmits the probe request frame to the AP, and then may operate in the doze state till the target probe response time. That is, the STA transmits the probe request frame to the AP, and may notify whether the AP receive the probe response frame through the probe response time information element by switching to the awake state at a certain point.

The AP receives the probe request frame, and may identify the target probe response time through the sleep wait field of the probe response time information element. The AP may reserve the target probe response time as the time for transmitting the probe response frame.

Some other STAs and APs that overhear the probe request frame transmitted from the STA may identify the value indicated by the probe response time information element, and may identify the target probe response time when the probe response frame is about to be transmitted by the AP which is to answer in response to the relevant probe request frame. Other APs and STAs may be implemented not to access the channel at the target probe response time in order to guarantee the transmission of the probe response frame of the AP.

When the sleep wait time is ended, which is indicated by the sleep wait field of the probe response time information element is over, the STA enters in the awake state (S750).

The AP transmits the probe response frame to the STA (S760). The AP may try to access the channel in order to transmit the probe response frame from the target probe response time. When other APs and STAs are implemented not to access the channel at the target probe response time by overhearing the probe request frame, the AP may normally access the channel and transmit the probe response frame at the target probe response time. The probe response frame that is transmitted by the AP may be implemented as described above in reference to FIGS. 4 to 6.

The STA that receives the probe response frame from the AP may enter in the doze state (S760). The STA may update the system information which belongs to itself based on the updated information acquired. In addition, the STA may synchronize the local clock with the global clock based on the value of the timing synchronization function (TSF) of the time stamp field included in the probe response frame.

Meanwhile, if there is no limit on the channel access by other APs and STAs as such, the AP may not transmit the probe response frame by accessing the channel at target probe response time, therefore, the transmission of the probe response frame may be delayed. That may result in the problem that the STA which enters in the awake state may keep consuming the power by continuously maintaining in the awake state. To solve such a problem, when the STA transmits the probe request frame, the STA may transmit the wake-up duration field with it being included in the probe response time information element, and which indicates the time interval operating in the awake state from the target probe response time. That is, the probe request frame includes the probe response time information element that contains the information relevant to the time interval operating in the awake state in order for the STA to receive the probe response frame from the AP. The probe response time information element may include the sleep wait field and the wake-up duration field. The STA maintains in the awake state during the time interval of the wake-up duration time interval indicated by the wake-up duration field from the target probe response time. However, if the STA fails to receive the probe response frame, the STA may enter in the doze state again when the wake up duration time is over.

The AP may be aware of the time interval in which the STA maintains the awake state through the probe response time information element. Accordingly, the AP may transmit the probe response frame before the wake-up duration time interval is ended, which is indicated by the wake-up duration time field from the target probe response time. If the wake-up duration time interval is ended while the AP is transmitting the probe response frame to the STA, the AP may interrupt the transmission of the probe response frame.

According to the communication method as an exemplary embodiment of the present invention, the STA that operates in the power save mode may actively synchronize the timing by transmitting the probe request frame to the AP. In the environment in which the timing error may be increased between the local clock of the STA and the global clock of the BSS, which caused by elongated time interval operating in the doze state by the STA, the timing may be synchronized by the request of the STA. Accordingly, the power consumption may be prevented, which may be occurred when the STA enters in the awake state at the wake-up interval according to the local clock and waits for receiving the beacon frame, and the STA may acquire the system information more quickly because the waiting time decreases.

According to the communication method as an exemplary embodiment of the present invention, the STA that operates in the power save mode transmits the information of identifying the system information to the AP, which is the basis for the system management by itself. The AP may identify the presence of the updated information that is not acquired by the STA among the system information which is the basis of the BSS management at present based on the corresponding system information identification information. Consequently, the AP may selectively provide the updated information to the STA, and the STA may acquire the system information more quickly through it, and may carry out the operation in order to be provided of normal wireless LAN service.

According to the communication method as an exemplary embodiment of the present invention, the STA may be signaling the specific time when the response of the AP is given at the request of the timing synchronization and/or the updated system information. The unnecessary power consumption of the STA may be prevented, which occurs by maintaining in the awake state unnecessarily during the delay time due to the preparation of the frame by the AP after entering in the awake state at the wake-up interval.

Figure 8:
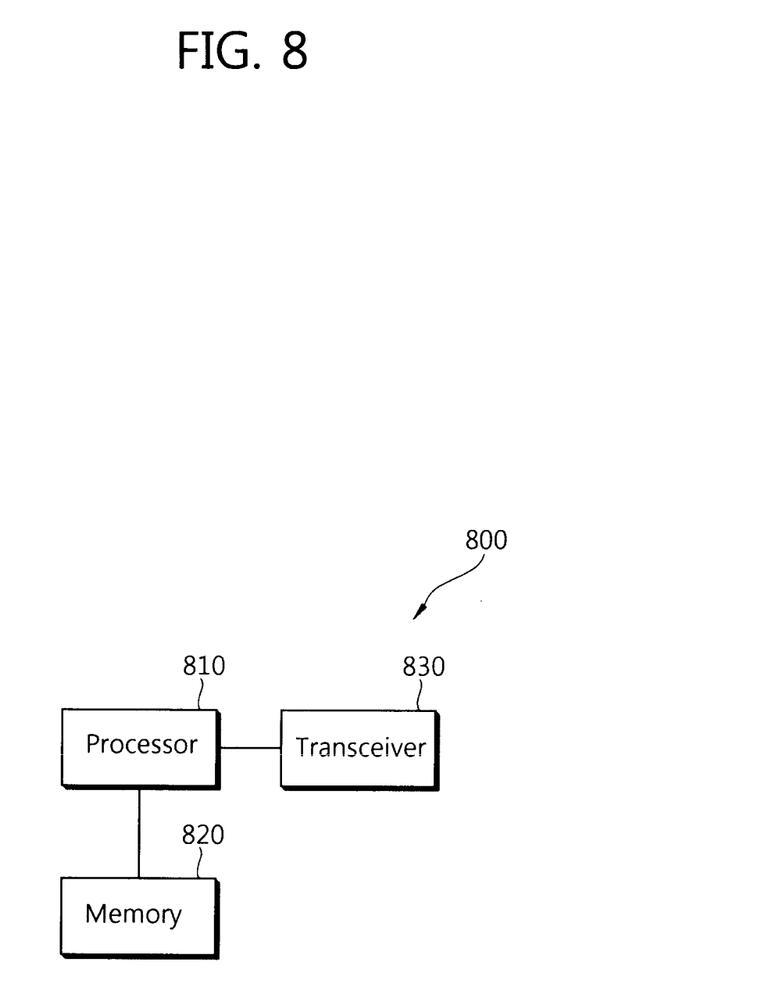
FIG. 8 is a block diagram illustrating a wireless apparatus in which the embodiment of the present invention can be implemented.

FIG. 8 is a block diagram illustrating a wireless apparatus in which the embodiment of the present invention can be implemented.

Referring to FIG. 8, a wireless apparatus 800 includes a processor 810, a memory 820 and a transceiver 830. The transceiver 830 transmits and/or receives a wireless signal, which is implemented by a physical layer of IEEE 802.11 standard. The processor 810 may be functionally connected to the transceiver 830, and may be set up to determine whether any bufferable frame for itself is buffered or not, which is performed by receiving the TIM element. The processor 810 may be set up to transmit the PS-poll frame or SP poll frame of the copied format. The processor 810 may be configured to transmit and receive the buffered frame. The processor 810 may be set up to switch between the doze state and/or the awake state according to the transmission and the reception of the TIM element and the buffered frame. The processor 810 may be configured to implement the description in reference to FIGS. 4 to 7 according to an embodiment of the present invention.

The processor 810 and/or the transceiver 830 may include an application specific integrated circuit (ASIC), other chipsets, a logic circuit and/or a data processing device. When an embodiment is implemented by software, the above-described technique may be implemented by the modules (a processing, a function, and the like) that perform the aforementioned functions. The modules are stored in the memory 820, and may be executed by the processor 810. The memory 820 may be included in the processor 810, and may be functionally connected with the processor 810 by various known means with separately positioned outside.

Although the methods are described based on the flow charts as a series of steps or blocks in the aforementioned exemplary system, the present invention is not limited to the order of the steps. A certain step may take place differently from the aforementioned steps, with different order or at the same time. In addition, it may be understood to one of ordinary skill in the art that the steps shown in the flow chart are not exclusive, but rather may include other steps, and one or more of the steps may be deleted without influencing the scope of the present invention.

What is claimed is:

1. A communication method performed by a station (STA) that operates in a wireless LAN system, the method comprising:
receiving, by the STA, a first change information from an access point (AP);
transmitting, by the STA, a probe request frame to the AP, the probe request frame including the first change information; and
receiving, by the STA, a probe response frame including updated information to be updated by the STA in response to the probe request frame,
wherein the updated information is determined by comparing the first change information with a second change information,
wherein the first change information includes information related to a change of at least one information element of a beacon frame from previously configured information elements of the beacon frame, and
wherein the second change information includes information related to another change of at least one information element of the beacon frame from the previously configured information elements of the beacon frame updated by the change of at least one information element.

2. A wireless apparatus operable in a wireless LAN system, the wireless apparatus comprising:
a transceiver transmitting and receiving a radio signal; and
a processor functionally connected to the transceiver, wherein the processor is configured to:
receive a first change information from an access point (AP);
transmits a probe request frame to the AP, the probe request frame including the first change information, and
receive a probe response frame including updated information to be updated by the STA in response to the probe request frame,
wherein the updated information is determined by comparing the first change information with a second change information,
wherein the first change information includes information related to a change of at least one information element of a beacon frame from previously configured information elements of the beacon frame, and
wherein the second change information includes information related to another change of at least one information element of the beacon frame from the previously configured information elements of the beacon frame updated by the change of at least one information element.

3. A communication method performed by an access point (AP) in a wireless LAN system, the method comprising:
transmitting, by the AP, a beacon frame to a station (STA), the beacon frame including information related to a first change information;
receiving, by the AP, a probe request frame from a station (STA), the probe request frame including the first change information, and
transmitting a probe response frame including updated information to be updated by the STA in response to the probe request frame,
wherein the updated information is determined by comparing the first change information with a second change information,
wherein the first change information includes information related to a change of at least one information element of a beacon frame from previously configured information elements of the beacon frame, and wherein the second change information includes information related to another change of at least one information element of the beacon frame from the previously configured information elements of the beacon frame updated by the change of at least one information element.

4. The method of claim 1, wherein a value of the second change information is larger than a value of the first change information, and wherein the probe response frame further includes the second change information.

5. The method of claim 1, wherein the first change information is received via a beacon frame transmitted from the AP.

6. The method of claim 1, wherein the probe response frame further includes a timing synchronization function (TSF) field for timing estimation.

7. The wireless apparatus of claim 2, wherein a value of the second change information is larger than a value of the first change information, and wherein the probe response frame further includes the second change information.

8. The wireless apparatus of claim 2, wherein the first change information is received via a beacon frame transmitted from the AP.

9. The wireless apparatus of claim 2, wherein the probe response frame further includes a timing synchronization function (TSF) field for timing estimation.

10. The method of claim 3, wherein a value of the second change information is larger than a value of the first change information, and wherein the probe response frame further includes the second change information.

11. The method of claim 3, wherein the probe response frame further includes timing a synchronization function (TSF) field for timing estimation.

* * * * *